United States Patent [19]

Oliver, Jr. et al.

[11] Patent Number: 4,474,240
[45] Date of Patent: Oct. 2, 1984

[54] DRILLING FLUID DISPLACEMENT PROCESS

[76] Inventors: John E. Oliver, Jr., 3752 Del Monte, Houston, Tex. 77019; Arnold M. Singer, 3042 Las Palmas, Houston, Tex. 77027

[21] Appl. No.: 460,130

[22] Filed: Jan. 24, 1983

[51] Int. Cl.³ .............................................. E21B 21/14
[52] U.S. Cl. ................................ 166/312; 252/8.55 B
[58] Field of Search ............................ 166/291, 312; 252/8.55 R, 8.55 B

[56] References Cited

U.S. PATENT DOCUMENTS

| Re. 23,614 | 1/1953 | Denman | 210/749 |
|---|---|---|---|
| 2,324,254 | 7/1943 | Bertness et al. | 252/8.55 B |
| 2,414,668 | 1/1947 | Ratcliffe | 166/312 X |
| 2,969,322 | 1/1961 | Weiss et al. | 252/8.55 R |
| 3,012,606 | 12/1961 | Brooke | 252/8.55 R X |
| 3,122,203 | 2/1964 | Hawkins | 252/8.55 R X |
| 3,254,714 | 6/1966 | Gogarty et al. | 166/274 |
| 3,532,168 | 10/1970 | Webb | 166/312 X |
| 3,688,845 | 9/1972 | Messenger | 166/291 |
| 3,787,319 | 1/1974 | Larsen | 252/8.5 |
| 3,846,311 | 11/1974 | Sharp et al. | 252/8.55 B |
| 3,882,029 | 5/1975 | Fischer et al. | 252/8.5 |
| 3,884,302 | 5/1975 | Messenger | 166/291 |
| 4,003,856 | 1/1977 | Sharp | 252/8.55 B X |
| 4,032,460 | 6/1977 | Zilch et al. | 252/8.55 |
| 4,046,197 | 9/1977 | Gruesbeck, Jr. et al. | 252/8.55 R X |
| 4,083,407 | 4/1978 | Griffin, Jr. et al. | 166/291 |
| 4,223,732 | 9/1980 | Carriay et al. | 166/291 |
| 4,255,258 | 3/1981 | Carr et al. | 210/727 |
| 4,330,414 | 5/1982 | Hoover | 252/8.55 R X |

OTHER PUBLICATIONS

Societe of Petroleum Engineers of AIME (SPE) 9425, "Field Experience Utilizing High Density Brines as Completion Fluids".
Laboratory Investigation of Lightweight, Low-Viscosity Cementing Spacer Fluids.
SPE 8253, Primary Cementing: The Mud Displacement Process Drilling Fluids Handbook, Chemical Wastes for Mud Removal, pp. 1–23.

Primary Examiner—George A. Suchfield

[57] ABSTRACT

A process for eliminating drilling fluid (mud, solids and oil) from a well system prior to introduction of solids-free completion and packer brine. Drilling fluid is displaced by circulating through well pipe and annulus of a treated water (surfactant and alcohol) to complete removal of drilling fluid. A plug of a gelled aqueous spacer may be used before or after the treated water. The plug spacer is displaced from the well system by the following treated water or circulating therein of the solids-free brine. The spacer isolates efficiently the treated water from the displaced drilling fluid or the displacing brine. If the drilling fluid is inverted, the spacer can be an inverted gel of bentone, water and diesel oil.

21 Claims, 1 Drawing Figure

DRILLING FLUID DISPLACEMENT PROCESS

BACKGROUND OF THE INVENTION

1. Field of the Invention

This invention relates to the use of high and low density brines in wellbores, and it more particularly relates to the complete removal of drilling fluid (mud, solids and oil) from the wellbore prior to introduction of the solids-free brines.

2. Description of the Prior Art

Aqueous brine solutions of high density are used in wellbores employed in the production of petroleum. These solutions have been used as both drilling, completion and packer fluids especially in deep wells subject to high formation oil and gas pressures at elevated temperatures. These brines can be formed of the sodium, potassium, calcium and zinc salts with chloride and bromide ions. These aqueous fluids may include corrosion inhibitors and other salts such as soda ash. The density of these salt type well fluids depends on the particular salt, or mixture of salts, and their concentration in the aqueous well fluid. Usually, these salt type well fluids have a density in the range of between about 8 and 19 pounds per gallon.

The salt type well fluid should be solids-free in its use as a well fluid. If there are solids in a packer or completion fluid, they can cause serious injury to a producing formation by plugging of the pore spaces therein or even of the perforations and channels provided to induce fluid flows between the formation and well bore. If there are solids in a packer fluid, the solids will precipitate with time upon the packer. As a result, these solids deposit make it difficult to disconnect the tubing from the packer with a resultant costly well workover.

The high density brine can be prepared at the wellsite by dissolving the prescribed amount of salt into the aqueous phase, which phase is principally fresh or sea water but it can include various inhibitors for preventing pitting, corrosion, etc. The mixture is circulated or agitated in the surface mud system equipment until there are no undissolved salt solids. Naturally, the problems of adding salts to be dissolved in the aqueous well fluid became progressively more severe as the density increases, both in time, manpower and equipment requirements. Importantly, the surface mud system must be scrupulously clean of any solids, especially the solid and oil portions of drilling mud. Otherwise, the prepared brine must be filtered to remove solids until the solids content has been reduced to 0.2% or lower.

At present, vendors will deliver to the wellsite the prepared high density brine of a desired density and combination of selected ingredients. The delivery of brine usually requires several changes in containers. For example, the brine is moved from the vendor tanks to truck transport, offshore supply boat and into the rig mud system. In most circumstances, the brine becomes contaminated from the mud system by undesired solids, including residual water wetted solids and/or oil based drilling mud, weighting agents such as barite, rust, salt, silt, ferrous and ferric precipitates and sand, and other undissolved materials. Contaminating liquids such as mud bases, lubricants and diesel fuel can also be present in the mud system and entrained in the brine.

As a practical result, present day rig practices, especially offshore, require full stream filtration (usually in cartridge filters) of the brine so that solid levels of 0.2% or less are reached immediately before the brine is sent into the well bore.

A process has been developed for removing the contaminating solids from high density, salt-type (brine) aqueous drilling, completion and packer fluids before their placement into a well bore. This process is described in our pending application Ser. No. 310,653 filed Oct. 13, 1981, which application for descriptive purposes is incorporated herein. Thus, the solids contaminated brine can be cleaned by our unique process, specifically before it enters the surface mud equipment of the well system.

Although the brine can be made solids-free at the rig, it is preferred to clean the well system of drilling fluid or mud solids oil, etc. before introduction of the brine into it. One of the main problem areas in removing drilling fluid is from the wellbore equipment which includes the tubing or well pipe and the annulus between it and the casing or surrounding wellbore.

Many chemical washes have been proposed and used to remove drilling fluid from the wellbore equipment prior to introduction of the solids-free brine. For example, circulating chemical washes using water with surfactants, viscosifiers and gel agents, chemical aids such as sodium tetraphosphate, weighting agents such as barite have been used under turbulent flow conditions for achieving effective mud removal from the wellbore equipment. In some cases, the chemical washes are used as aqueous spacers for increased drilling fluid removal much in the same manner as used to displace drilling fluid prior to a cement slurry used in well cementing operations.

Usually the chemical washes were designed for turbulent or upper laminar flow with aqueous phases of fresh and salt water continuous, and for plug flow using gelled water-based phases. The gelled water phase or plug was sufficiently viscous to attempt to reduce settling of drilling fluid from it, especially solids. If oil based drilling fluid was being displaced, diesel oil and emulsifier are added to increase removal of the drilling fluid and its mud cake. Some chemical washes combined turbulent and plug flow aqueous phases to enhance the displacements of drilling fluid from the wellbore equipment, especially prior to cementing operations or introduction of completion brine. These chemical washes were used, in some operations, in a single pass travel through the wellbore equipment for removing the drilling fluid so as to save rig time.

The present process is an improved process for removing substantially all of the drilling fluid or mud, including solids such as barite, bentonite, cement, etc. and oil materials, from the well bore equipment prior to entry therein of the solids-free completion and packer brine. As a result, the brine remains substantially free of solids but if filtration is needed, the filter loading remains very small and does not involve any significant expense in rig time. In this process the wellbore equipment is cleaned by treated water at turbulent flow placed as a slug between the drilling fluid being displaced and the solids free brine being introduced into the wellbore equipment. Aqueous spacers can preceed or follow the treated water. The overall rig filtering time to practice the present process requires only two-to-three hours. High angle directional wells (e.g. 70 degrees) will achieve considerably greater savings in filtering and trip time using this process.

SUMMARY OF THE INVENTION

In accordance with this invention, there is provided an improved displacement process for eliminating drilling fluid components of mud, solids and oil from wellbore equipment prior to introduction of solids-free completion and packer brine. The drilling fluid is displaced from the wellbore equipment by a treated water slug circulated at turbulent flow through the wellbore equipment for displacing drilling fluid before it. The treated water removes residual drilling fluid and has a novel composition of surfactant and alcohol in clean water subjected to agitation and shear mixing. After the treated water, the solids-free brine is introduced into the well bore equipment.

In other embodiments, a plug of gelled aqueous spacer can be introduced before or after the treated water. Where the drilling fluid is inverted, the spacer preferably preceeds the treated water and comprises an inverted gel formed of bentone, water and diesel oil. In other cases, the aqueous spacers can contain a viscosifier polymer such as hydroxyethylcellulose (HEC). Preferably, an aqueous spacer preceeds and follows the slug of treated water.

As a result, the drilling fluid, spacers and treated water leave the wellbore equipment clean for the brine introduced therein in a solids-free condition. The plugs and treated water can be specially composed so that the former travel at laminar flow and the latter at turbulent flow in the wellbore equipment at the same ranges of linear velocity.

DESCRIPTION OF THE PREFERRED EMBODIMENT

Figure 1:
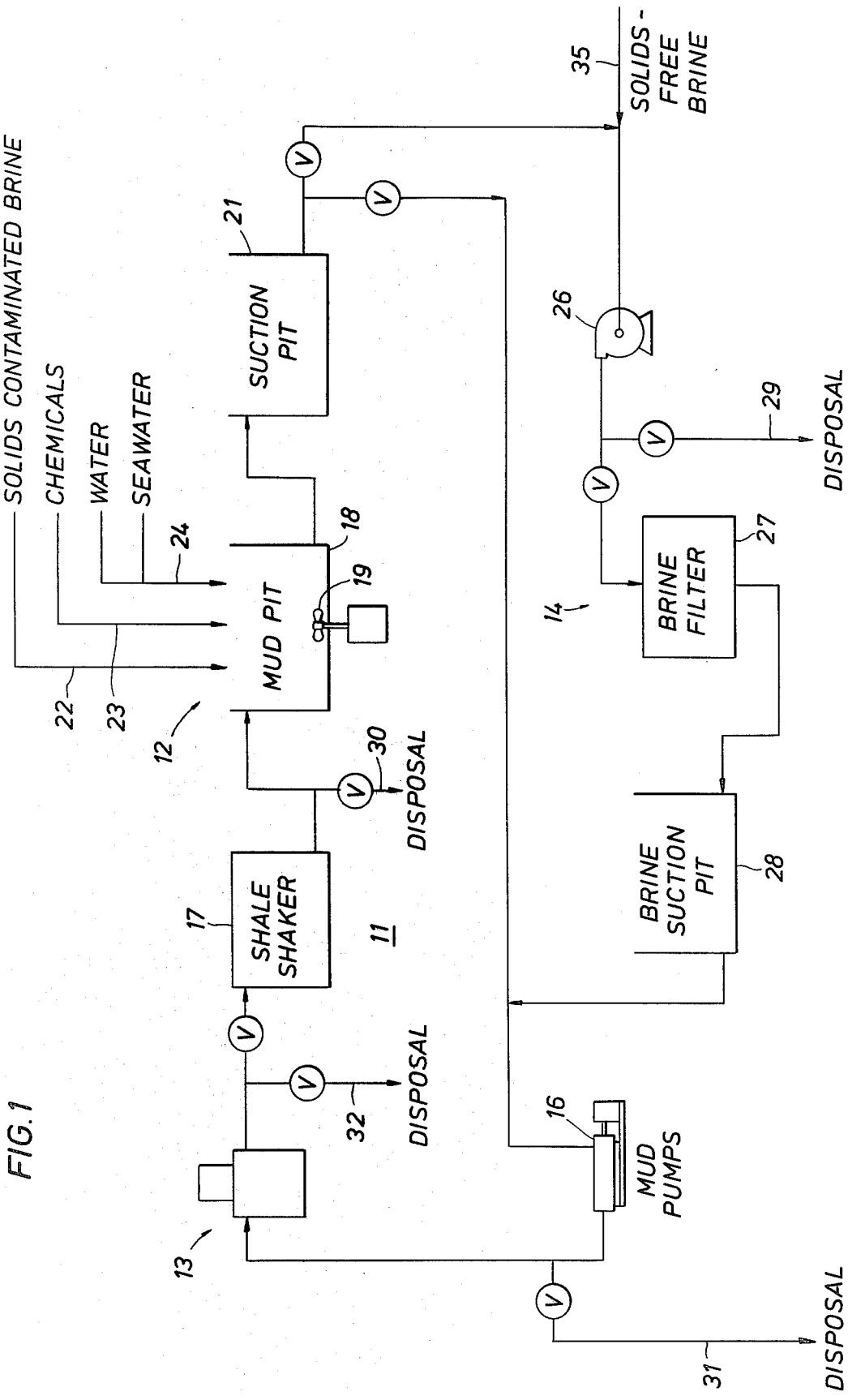
FIG. 1 is a schematic flow diagram illustrative of a well system which includes filtering apparatus for preparing solids free brine prior to its introduction into the wellbore equipment priorly cleaned of drilling fluid.

Referring to the drawing, there is shown in schematic a well system 11 which includes surface equipment 12 and wellbore equipment 13 forming a part of the drilling fluid system which may be found on offshore and onshore oil well rigs. Also, the well system 11 can include a treating unit 14 which is adapted to remove solids so as to provide a high density brine in a low solids content, e.g., 0.2% or less by weight. The well system 11 can include other apparatus, or apparatus in a different arrangement and yet be used to practice the present improved displacement process.

For example, the surface equipment can include mud pumps 16 to circulate drilling mud through the wellbore equipment 13, and the circulating loop from this equipment can have a shale/desander/desilter shaker 17, a mud pit 18 with power driven mixers 19 and a suction mud pit 21. The mud pit 18 and suction pit 21 can be conventional metal vessels.

The mud pit 18 may contain inlets 22, 23 and 24 for the addition of various well materials such as solids contaminated brine, chemicals and clean or sea water. The terminology clean or sea water are meant to designate water that may be fresh or salty as from the ocean but with relatively low solids contents, e.g., less than 200 p.p.m.

In usual practice, the surface equipment 12 will be used to receive the brine from a source, such as barge or truck transport, and to treat the brine to a solids-free condition for placement into the wellbore equipment 13. Solids contaminated brines can be treated to the desired solids free condition in the surface equipment 12 by the unique process described in the pending patent application heretofore identified. However, the surface equipment should be substantially free of drilling mud to insure efficient results from this process.

The brine treating unit is interconnected by valving and flow lines to the suction pit 21 and mud pumps 16 so that the brine can be moved by a centrifugal pump 26 through a filter 27 (e.g. cartridge type) into a brine suction pit or vessel 28. Then, the mud pumps 16 can introduce the brine into the wellbore. Usually, the filter 27 is arranged to make the brine solids free to a residual solids content of 0.2% or less.

The wellbore equipment 13 can include the well head, casing, tubing, packers, valving and other well associated apparatus, such as the blow-out preventers and surface mud lines, etc.

Several disposal lines 29–32, with auxillary control valves are included in the well system 11 so that the fluid from either the surface equipment 12 or the brine treatment unit 14 can be discharged to a suitable disposal in a pollution free and environmental safe region. An inlet 35 to the pump 26 can be used to introduce relatively solids free brine into the brine treatment unit 14.

The surface equipment 12 is usually cleaned of drilling fluid by suitable chemical and water washes so that the steps of this process can be practiced without introducing undesired solids into the wellbore equipment 13.

In many applications, a slug of treated water is introduced in the wellbore equipment to effectively displace the drilling fluid from the system. In this case, the treated water is itself displaced directly by circulating solids-free brine into the well bore equipment 13. The treated water is a special mixture of surfactant and alcohol in clean water, and it will be described in more detail hereinafter. However, the treated water slug, especially when under turbulent flow conditions, very effectively displaces and carries the drilling fluid from the well bore equipment as a result, the circulating brine will acquire no solids, or such small amounts of solids that a short period of filtering makes the brine solids-free.

In other applications, aqueous spacer plugs can be used before, after (or both) the treated water. The primary purposes of the preceeding aqueous spacer are to (1) reduce gravity mixing of the treated water with either the drilling fluid or solids-free brine, (2) retain and transport well fluid solids such as drilling mud, silt, sand, oil, barite, ferrous and ferric precipitates and other undisolved solids from the well bore equipment. The primary purpose of the following aqueous spacer is to reduce gravity mixing between the treated water and brine.

Usually, the present process removes drilling fluid from the well bore very efficiently so that only the first portion of the circulating brine (e.g., 100 bbls) has any solid contamination.

In this process, an aqueous spacer plug may be used before the treated water slug.

An aqueous spacer is prepared which contains a viscosifier to produce a non-Newtonian fluid that can be circulated in laminar flow in the wellbore equipment. For example, a small amount (e.g., 50 bbls) of fresh or salt water is placed into the pit 19 and a viscosifier is added that produces a gelled state for this mixture. For example, viscosifiers used in drilling mud products are suitable such as Polybrine, Polymix, Cellosize, Duovis (tradenames) solid commercially by Magcobar Division of Dresser Industries, Inc. For oil based drilling fluids, this group has available a diesel viscosifier under the tradename Oilfaze which can be used in conjunction with diesel fuel or selected crude oils, clays such as bentone, emulsifiers and weighting agents (e.g., barite). The viscosifier is added to the aqueous phase in amounts sufficient to produce the gelled state and to maintain this state under laminar flow conditions at the linear flow velocity where the following treated water moves at such velocity under turbulent flow. Generally, the gelled aqueous spacer operates at a Reynolds number of about 100 wherein the treated water is at a Reynolds number of about 2000.

Stated in a different manner at the certain linear flow velocity, the gelled aqueous spacer flows below or at the maximum velocity for plug (laminar) flow while the aqueous spacer flows at or above the minimum critical velocity to achieve turbulent flow in the wellbore equipment.

There are many suitable viscosifiers available from mud product suppliers, and they can be substituted for the specific tradename products heretofore recited. These products have known reheological properties and a gelled aqueous phase can be prepared with the desired non-Newtonian state.

In many cases, it is preferred that a weighting agent be also included in the gelled aqueous phase. For example, barite may be added to increase the phase weight up to 20 pounds per gallon. Other viscosifiers such as Bentone, Attapulgite, or asbestos fibers can be used with good results. These materials also enhance the action of the gelled aqueous spacer to act as a mechanical swab to not only displace the drilling fluid from the wellbore equipment, but also may remove mud cake deposited on the walls of the well pipe, casing or wellbore.

Although the gelled spacer fluid acts as a true plug or mechanical swab, well effects cause it to be "strung out" in its passage through the wellbore equipment. For example, 50 barrels of the plug may be introduced into the wellbore equipment, but it may require an outflow of twice this volume because of the entrained drilling fluid, etc. intermingled within it.

If the drilling fluid is oil base, and especially as an inverted emulsion (water-in-oil), the gelled aqueous spacer preferably includes a liquid blend of emulsifiers, wetting agents, lubricants, gellants and other additives such as organophyllic clay, HEC polymers, starch, polyanionic cellulose, guar gum, etc. which additives quickly form a stable inverted emulsion fluid when mixed with diesel fuel and water under moderate shear level mixing. For example, the aqueous spacer of inverted oil type can be formed of water and organophyllic clay. This spacer prepares the mud coated pipe and the oil based drilling fluid for effective displacement from wellbore equipment by the following treated water slug.

The aqueous spacer is moved from the pit 18 and suction pit 21 and forced by the pumps 16 into the wellbore equipment 13. In deep wells, the aqueous spacer is introduced into the well pipe (tubing or drill pipe) and displaces drilling fluid upwardly from the annulus to the shale shaker 17, or other suitable disposal as by disposal line 32. However, in other applications, the aqueous spacer can be introduced downwardly through the annulus and forces the drilling fluid upwardly through the wellpipe. In either event, the aqueous spacer is in a gelled state forming a discrete plug that acts as a mechanical swab in displacing the drilling fluid before it.

The linear velocity of the aqueous spacer plug being displaced through the wellbore equipment depends upon the hole diameter or annulus size and usually ranges between 80 and 200 feet per minute to maintain the laminar flow condition for the non-Newtonian aqueous spacer which has flow conditions Reynolds Number of about 100.

The treated water is circulated into the wellbore equipment usually immediately following a gelled aqueous spacer. The treated water volumetrically displaces the plug of aqueous spacer and also provides a unique cleaning function in removing residual drilling fluid and other solids such as rust, ferrous and ferric precipitates, sand, silt, oil and other undissolved materials from the wellbore equipment.

The treated water is prepared, preferably in the mud pit 18, by adding together clean (fresh or sea) water, surfactant and an alcohol. The treated water is subjected to agitation and shear mixing by the mixer 19. The amount of treated water depends on the capacity and strength of the wellbore equipment 13, the formation pressure, and the physical condition of the well, (i.e., open high pressure perforations, or liner tops that will not allow reduction in hydrostatic head) and may be prepared in an amount, for example, of 25-1000 barrels.

Usually, the treated water is comprised in a chemical-to-water ratio of 4 drums (52.5 gallons each) admixed with each 500 barrels (42 gallons each) of water added in the pit 18. Each drum is comprised of a 50/50 composition of the surfactant and alcohol. As a result, the treated water has a concentration by volume each of about 1.0% of surfactant and alcohol. In most situations, the concentration of the chemicals need not be greater than 2%, and a 1% concentration usually works well. If desired, other materials can be added that assist the treated water performance, such as sand, walnut shells, etc.

The alcohol can be an aliphatic alcohol with between 5 and 8 carbon atoms and the surfactant is a surface active-chemical aid with a molecular weight in the range of about 150 to about 500 with predominately hydrophobic characteristics. The surfactant is selected from the group comprising aliphatic amines, amides and aliphatic amine oxides wherein the amine and amide have an alkyl group with between 8 and 18 carbon atoms.

In the preferred embodiment, the alcohol is 2-ethylhexanol and the surface active chemical aid is bis hydroxy ethyl cetyl amine and each chemical is used in about equal amounts by volume in the clean/sea water used in preparing the treated water. Reference may be taken to our mentioned application for a more detailed description of these chemicals.

Other alcohols that work well include n-pentanol, n-hexanol and octanol.

Various amines can be used in this process. For example, the alkynol amines which are available under the Aquiness trademark can be used, such as Aquiness MA401A. It is understood that this amine is principally bis hydroxy ethyl cetyl amine.

Other examples of amines usable in this invention are cocoamine, octylamine, dioctylamine, decylamine and dodecylamine. Cocoamine may be generally represented by the formula $CH_3(CH_2)_{10}CH_2-NH_2$ and it is prepared from monoethenoid fatty acids derived from coconuts. The "coco" group $C_{12}H_{25}$ is not a group containing a specific number of carbon atoms, but is a number of individual groups containing different numbers of carbon atoms, but is a number of individual groups containing different numbers of carbon atoms. However, the $C_{12}H_{25}$ group is in greater amount than any other group.

The cocoamine may be a condensation product, i.e., oxalkylated cocoamine such as ethoxylated cocoamine with between 2 and 15 mols of ethylene oxide. More particularly, the condensation product is formed by subjecting cocoamine to a condensation with a plurality of mols of ethylene oxide in a manner well known in the art. In general, the condensation product of a mol of cocoamine with between 2 and 15 mols of ethylene oxide may be employed with good results. Preferably the condensation product is formed by condensing 10 mols of ethlene oxide per mol of cocoamine. Expressed on the basis of molecular weight, the ethoxylated cocoamine may have an average molecular weight between 285 and 860, but preferably, has an average molecular weight of about 645.

The treated water is moved from the pits 18 and 21 and forced by the mud pumps 16 into the wellbore equipment immediately behind the plug of gelled aqueous spacer. The flow of the treated water drives this plug before it, which plug volumetrically displaces the drilling fluid from the wellbore equipment 13. Besides its function as a displacing fluid, the treated water removes residual drilling fluid and its mud cake from the wall surfaces when pumped under turbulent flow conditions.

The treated water has a Reynolds number of about 2000 and turbulent flow conditions are obtained in the wellbore equipment at linear flow velocities between about 80 and about 200 feet per minute. The turbulent flow condition is meant to include true turbulence above the critical velocity for the treated water and also the condition at the upper limits of linear flow which are essentially in the effect the same as turbulent flow in cleaning results relative to the drilling fluid. Thus, the treated water and the plug of gelled aqueous spacer can be moved at a range of flow velocities where the treated water is in turbulent flow and the plug moves at linear flow conditions.

The treated water removes substantially all of the residual drilling fluid (both mud, solids and oils) from the well system. The drilling fluid is carried in an agglomeration resembling gel-like soft masses of solids in a relatively stable suspension. The treated water effects a scrupuleous cleaning of the wellbore equipment and removes residual drilling fluid in the wellbore equipment and no significant amounts of drilling fluid constituents escape its cleaning action. Stated in another manner, all of the remaining drilling fluid from the earlier displacement by the gelled aqueous spacer is now suspended in the treated water. No cleaning by rig workpersons is required using swabs, etc. in the wellbore equipment. The unique treated water has removed from the equipment and carries the residual drilling mud in suspension.

While the treated water is yet being circulated within the wellbore equipment, it is displaced via disposal line 29–32 to a suitable non-polluting and safe disposal region. It can also be treated in the shale shaker, if desired. The treated water is followed immediately by a second plug of gelled aqueous spacer which can be the same composition and volume as the previously described spacer. However, the second plug can have a different gelled aqueous spacer composition if desired.

In some operations, the second plug can be made more compatible for volumetric displacement of the treated water by the subsequently introduced solids-free brine. For this purpose the viscosifier is preferably a high molecular weight polymer used in clear brine systems, such as hydroxyethyl cellulose (HEC). A fluid-loss control agent can also be added. For example, the blend of HEC and fluid-loss control agent can be supplied by the tradename product Polybrine, a product of Macobar Division of Dresser Industries. In any event, the viscosifier and other additives must be operable at the temperature conditions in the wellbore equipment so as to function properly as the plug of gelled aqueous spacer.

The second plug of gelled aqueous spacer is introduced into the wellbore equipment 13 by the mud pump 16 and immediately followed by the solids-free brine from the brine suction pit 28. Naturally, this brine should be solids-free.

If the brine is heavily loaded with solids as by transportation in dirty ships, it is placed into the mud pit 18 from which the treated water and second plug of gelled aqueous spacer have been removed to the wellbore equipment 13. The dirty brine can then be treated by the process in our previously mentioned application.

If the brine is lightly loaded with solids, or free of solids, it is introduced at the inlet 35 and preferably forced by the pump 26 through the brine filter 27 and stored in the suction pit 28. At this time, the brine should have a solids content of less than 2 p.p.m. The filter 27 will have a long life since the solids loading from the brine is relatively low, e.g. 25 p.p.m.

Using the mud pump 16, the brine is moved from the pit 28 into the wellbore equipment and it volumetrically displaces the first plug of gelled aqueous spacer, the treated water, and the second plug of gelled aqueous spacer through the disposal line 32. The brine enters a clean well system free of drilling fluid solids etc.

The well system is now ready for subsequent activities once the wellbore equipment 13 is filled with the solids free brine.

The brine is pumped into the wellbore equipment at the same linear flow velocity as the treated water so that the plugs of gelled aqueous spacer move at laminar flow conditions while the treated water flows at substantially turbulent flow conditions. Preferably, there is no interruption of circulation of these fluids but momentary stoppages of flowing can be tolerated since the plugs of gelled aqueous spacers minimize cross contamination between the drilling fluid, treated water and brine being volumetrically displaced through the wellbore equipment.

In an actual field test on an oil-based mud, the present process was used to complete a well with solids-free brine. The following data define this process:

(1) well depth 17,500 feet with 7 inch casing and 3½ drill pipe with a drill pipe volume of 128 barrels, an annular volume of 378 barrels and a total volume of 506 barrels;

(2) first plug of gelled aqueous spacer was 47 barrels of 8.7% by volume of Baroid EZ Spot in clear water weighted with barite to 14.5 pounds per gallon;

(3) The treated water was 575 barrels of sea water containing 1.74% by volume of 50/50 ratio of 2 ethylhexanol and bis hydroxy ethyl cetyl amine;

(4) the second plug of gelled aqueous spacer was 10 barrels of 0.01% by weight of HEC in clear water;

(5) the following brine was 10 pounds per gallon of solids-free calcium chloride solution.

The first plug was introduced into the drillpipe followed by the treated water with a maximum annular flow velocity of 136 feet per minute. Then, the second plug was introduced and followed by the brine at an annular flow velocity of 375 feet per minute. The well equipment was displaced within about 2¼ hours.

Although about 10 barrels of a 14½ pound per gallon Invermul drilling mud was inadvertently introduced ahead of the second plug, the final portions of the treated water were clear as originally introduced. The well equipment was free of solids so that the brine remained solids free and thereinafter producing the one-pass cleansing process described herein.

The initial portions of the treated water displaced from the well equipment brought up tons of dirt and several hundred pounds of cement even though circulation was interrupted several times during the process. It is estimated that 12 hours of rig time was saved by using this process instead of earlier chemical washing procedures and the well equipment was made substantially free of solids before introduction of the brine.

In another field test, in well bore equipment, a 15.5 pound per barrel Invermul oil based mud was displaced at a reverse flow of about four barrels per minute. A first spacer plug was introduced onto the drilling mud, which spacer was 20 barrels formed of 2 drums of Baroid "Easy Spot" emulsifier and diesel oil and weighted to 15.5 pounds per gallon. A second spacer plug followed the first spacer, and was used in an amount of 15 barrels. The second spacer was sea water containing 50 pounds per barrel of "Nut Plug" (ground walnut shells) with one-half drum of a 50/50 mixture of surfactant and alcohol as used in the treated water of the previous example. Yet a third spacer plug was used following the second spacer plug. This third spacer was 40 barrels of a high viscosity (120 Saybolt) mixture of HEC polymer with 100 pounds per barrel of "frac" sand. Then, the treated water slug in amount of 10 barrels was introduced and immediately followed by the solids-free brine. This treated water was used in amount of 10 barrels formed of fresh water containing one-half drum of the surfactant and alcohol of the previous example.

About 25 barrels of the brine first circulated through the well bore equipment was diluted and therefore discarded. The balance of the brine was made solids-free by filtration for about 90 minutes in circulation within a filter system.

A storm interrupted the above process for 24 hours. It was noted that the "Nut Plug" floated to the top of the second spacer. However, when circulation was again practiced, the treated water slug performed as expected.

In other field tests, the present process uses only the first spacer plug and the treated water slug before the circulation of solids-free brine through the well bore equipment for good removal of the drilling mud. Where oil-based muds are present, it is preferred that the first spacer plug contain, or be preceeded by a few barrels of diesel fuel which may contain water-in-oil emulsifier.

The use of the treated water in the well system is of advantage since only small amounts of water are required. It has been found that the volumes of treated water and gelled aqueous spacers used in this process are in the range of 100 to 1000 bbls. This feature is important in water scarce areas and from a waste disposal viewpoint.

From the foregoing, it will be apparent that there has been herein described a displacement process for removing drilling fluid from wellbore equipment which is especially effective prior to introduction of solids free brine. Various changes and alterations may be made in the practice of this process by those skilled in the art without departing from the spirit of the invention. It is intended that such changes be included within the scope of the appended claims. The present description is intended to be illustrative and not limitative of the present invention.

What is claimed is:

1. A process for eliminating drilling mud fluid from a well system prior to introduction of solids-free completion and packer brines, the steps comprising:
   (a) displacing drilling fluid from the well system by circulating therein at turbulent flow conditions, a slug of treated water through the well system to displace therefrom a major portion of the drilling fluid from the well system, and the treated water prepared as Newtonion fluid from the addition of surfactant and alcohol to clean water and subjecting the treated water to agitation and shear mixing;
   (b) following the treated water, circulating therein a solids-free brine for displacing or carrying the treated water from the well system; and
   (c) an inverted gel spacer of bentone, water and a hydrocarbon such as diesel oil is introduced before the slug of treated water when the drilling fluid includes inverted emersion (water-in-oil) residues such as mud cake.

2. A process for eliminating drilling mud fluid from a well system prior to introduction of solids-free completion and packer, brines, the steps comprising:
   (a) displacing drilling fluid from the well system by circulating therein at turbulent flow conditions, a slug of treated water through the well system to displace therefrom a major portion of the drilling fluid from the well system, and the treated water prepared as a Newtonian fluid from the addition of surfactant and alcohol to clean water and subjecting the treated water to agitation and shear mixing;
   (b) following the treated water, circulating therein a solids-free brine for displacing or carrying the treated water from the well system;
   the surfactant and alcohol are added each in an effective amount to the clean water for producing the treated water and
   (c) the surfactant has a molecular weight in the range from about 150 to about 500 with predominantly hydrophobic characteristics, and the surfactant is selected from the group comprising aliphatic amines, amides and aliphatic amine oxides with the amine and amide constituents having between 8 and 18 carbon atoms, and the alcohol is an aliphatic alcohol with between 5 and 8 carbon atoms.

3. The process of claim 1 wherein the surfactant is bis hydroxy ethyl cetyl amine and the alcohol is 2 ethyl hexanol.

4. A process for eliminating drilling mud fluid from a well system prior to introduction of solids-free completion and packer brines, the steps comprising:

(a) displacing fluid from the well system by circulating therein in laminar flow at least one plug of aqueous spacer containing a viscosifier to produce a non-Newtonian fluid that is circulated in a gel state for displacing and carrying a major portion of fluid being displaced from the well system;

(b) circulating at turbulent flow conditions, a treated water through the well system to displace therefrom fluid from the well system, and the treated water prepared as a Newtonian fluid from the addition of surfactant and alcohol to clean water and subjecting the treated water to agitation and shear mixing;

(c) the aqueous spacer plug passing with the treated water from the well system without substantial mixing of the aqueous spacer plug and treated water into the following solids-free brine circulated into the well system; and (d) circulating solids-free brine into the well system.

5. The process of claim 4 wherein the aqueous spacer contains a weighting agent.

6. The process of claim 5 wherein the weighting agent is barite.

7. The process of claim 4 wherein the surfactant and alcohol are added each in a volume of less than 1 percent to the clean water for producing the treated water and the plug volumes of the aqueous spacers are a magnitude less than the volume of treated water circulated in the well system.

8. The process of claim 7 wherein the surfactant has a molecular weight in the range from about 150 to about 500 with predominately hydrophobic characteristics, and the surfactant is selected from the group comprising aliphatic amines, amides and aliphatic amine oxides with the amine and amide constituents having between 8 and 18 carbon atoms, and the alcohol is an aliphatic alcohol with between 5 and 8 carbon atoms.

9. The process of claim 4 wherein the surfactant is bis hydroxy ethyl cetyl amine and the alcohol is 2 ethyl hexanol.

10. A process for eliminating drilling mud fluid from a well system prior to introduction of solids-free completion and packer brines, the steps comprising:

(a) displacing fluid from the well system by circulating therein in laminar flow a plug of an aqueous spacer containing a viscosifier to produce a non-Newtonian fluid that is circulated in a gel state for displacing and carrying a major portion of the drilling fluid from the well system;

(b) immediately following the aqueous spacer plug, circulating at turbulent flow conditions, a treated water through the well system to displace therefrom the aqueous spacer plug carrying drilling fluid with the treated water removing and carrying drilling fluid from the well system, and the treated water prepared as a Newtonian fluid from the addition of surfactant and alcohol to clean water and subjecting the treated water to agitation and shear mixing;

(c) immediately following the treated water, circulating therein in laminar flow a plug of an aqueous spacer containing a viscosifier to produce a non-Newtonian fluid that is circulated in a gel state for displacing or carrying the treated water from the well system; and (d) displacing the aqueous spacer plug of step (c) from the well system by circulating therein of solids-free brine.

11. The process of claim 10 wherein the aqueous spacer in step (a) contains a weighting agent.

12. The process of claim 11 wherein the weighting agent is barite.

13. The process of claim 10 wherein the surfactant and alcohol are added each in a volume of less than 1 percent to the clean water for producing the treated water and the plug volumes of the aqueous spacers are a magnitude less than the volume of treated water circulated in the well system.

14. The process of claim 13 wherein the surfactant has a molecular weight in the range from about 150 to about 500 with predominantly hydrophobic characteristics, and the surfactant is selected from the group comprising aliphatic amines, amides and aliphatic amine oxides with the amine and amide constituents having between 8 and 18 carbon atoms, and the alcohol is an aliphatic alcohol with between 5 and 8 carbon atoms.

15. The process of claim 10 wherein the surfactant is bis hydroxy ethyl cetyl amine and the alcohol is 2 ethyl hexanol.

16. The process of claim 10 wherein the volumetric ratios in barrels of the aqueous spacer plug of step (a) to the treated water to the aqueous spacer plug of stet (c) is about 50/500/10 for a well system having a volumetric capacity of about 500 barrels.

17. The process of claim 10 wherein the aqueous spacer plug of step (c) is formed of clean water containing a viscosifier polymer.

18. The process of claim 17 wherein the viscosifier polymer is hydroxyethylcellulose (H.E.C.).

19. The process of claim 10 wherein the aqueous spacers plugs and treated water are circulated in the well system at linear flow velocity between 100 and 150 feet per minute.

20. The process of claim 19 wherein the linear flow velocity is about 136 feet per minute.

21. The process of claim 10 wherein a hydrocarbon such as diesel oil is included in the aqueous spacer of step (a) when the drilling fluid includes inverted imulsion (water-in-oil) residues such as mud cake.

* * * * *